(12) United States Patent
Tanoue et al.

(10) Patent No.: US 7,461,108 B2
(45) Date of Patent: Dec. 2, 2008

(54) BARREL SHIFT DEVICE

(75) Inventors: Kazufumi Tanoue, Osaka (JP); Daisuke Takeuchi, Osaka (JP); Tomoko Chiba, Osaka (JP)

(73) Assignee: Panasonic Corporation, Osaka (JP)

( * ) Notice: Subject to any disclaimer, the term of this patent is extended or adjusted under 35 U.S.C. 154(b) by 438 days.

(21) Appl. No.: 10/578,780

(22) PCT Filed: Aug. 31, 2005

(86) PCT No.: PCT/JP2005/015863

§ 371 (c)(1),
(2), (4) Date: May 9, 2006

(87) PCT Pub. No.: WO2006/030639

PCT Pub. Date: Mar. 23, 2006

(65) Prior Publication Data

US 2007/0180007 A1 Aug. 2, 2007

(30) Foreign Application Priority Data

Sep. 14, 2004 (JP) ............................. 2004-267007

(51) Int. Cl.
*G06F 7/00* (2006.01)

(52) U.S. Cl. ...................................... 708/209

(58) Field of Classification Search .................. 708/209
See application file for complete search history.

(56) References Cited

U.S. PATENT DOCUMENTS

| 5,822,231 | A | * | 10/1998 | Wong et al. | ................. 708/209 |
| 5,844,828 | A | * | 12/1998 | Fujimura et al. | ............ 708/209 |
| 2003/0131029 | A1 | | 7/2003 | Bandy | |

FOREIGN PATENT DOCUMENTS

| JP | 2000-293354 A | 10/2000 |
| JP | 2003-337694 A | 11/2003 |

* cited by examiner

*Primary Examiner*—Tan V Mai
(74) *Attorney, Agent, or Firm*—McDermott Will & Emery LLP

(57) ABSTRACT

When a barrel shift device is divided into pipeline registers and a shift process is executed in a multistage process stage, by decoding a second control signal for controlling a shift amount of a second shift circuit 50 using a decoding circuit 20, it is detected at what digit positions in intermediate data in an intermediate data holding circuit 30 data elements which are to be finally output as output data from the second shift circuit 50 are located. Based on a result of the detection of digit positions by the decoding circuit 20, the intermediate data holding circuit 30 holds only data elements to be finally output, among data elements in the intermediate data, and does not hold unnecessary data elements which are not included in the output data. Therefore, by controlling a data storage operation in the intermediate data holding circuit 30, an increase in power due to the pipeline structure is suppressed.

8 Claims, 8 Drawing Sheets

FIG.3

| C2[1] | C2[0] | 22 21 20 19 18 17 16 15 14 13 12 11 10 9 8 7 6 5 4 3 2 1 0 |
|---|---|---|
| Lo | Lo | ●————————————————————● (15–0) |
| Lo | Hi | ●————● (7–0) |
| Hi | Lo | ●————● (20–16) |
| Hi | Hi | ●————————● (20–8) |

FIG.4

| C2[1] | C2[0] | 22 21 20 19 18 17 16 15 14 13 12 11 10 9 8 7 6 5 4 3 2 1 0 |
|---|---|---|
| Lo | -- | ●————————————————● (15–0) |
| Hi | -- | ●————————————● (20–8) |

BARREL SHIFT DEVICE

RELATED APPLICATIONS

This application is the U.S. National Phase under 35 U.S.C. § 371 of International Application No. PCT/JP2005/015863, filed on Aug. 31, 2005, which in turn claims the benefit of Japanese Application No. 2004-267007, filed on Sep. 14, 2004, the disclosures of which Applications are incorporated by reference herein.

TECHNICAL FIELD

The present invention relates to a barrel shift device which performs right and left shift processes with respect to multi-bit data in a digital signal process.

BACKGROUND ART

Conventional barrel shift devices are composed of a multistage selector. On the other hand, for the purpose of improving a throughput in a signal process, there is a need for a barrel shift device which is divided into pipeline registers and in which a shift process is executed in a multistage process stage.

For example, Patent Document 1 discloses a conventional barrel shift device having a multistage selector configuration. The barrel shift device of Patent Document 1 has a structure in which shift circuits composed of a selector which selects, based on a control signal, whether or not a shift is performed are combined in stages. For example, in order to achieve an arbitrary shift ranging from a 15-bit left shift to a 16-bit right shift, shift circuits having 1-bit, 2-bit, 4-bit, and 8-bit left-shift functions, and a shift circuit having a 16-bit right-shift function are combined in stages. In this case, a 5-bit right shift is achieved by activating the 1-bit left-shift circuit, the 2-bit left-shift circuit, the 8-bit left-shift circuit, and the 16-bit right-shift circuit.

Hereinafter, a configuration and its operation when a pipeline structure is introduced into the barrel shift device of Patent Document 1 will be described in detail with reference to FIG. 10.

FIG. 10 is a schematic diagram illustrating the barrel shift device of Patent Document 1 with a pipeline structure introduced thereinto. A first shift circuit 10 performs a shift process with respect to input data based on a first control signal, and outputs the resultant data as intermediate data 30. Here, the first shift circuit 10 is composed of a 1-bit left-shift circuit 11, a 2-bit left-shift circuit 12, and a 4-bit left-shift circuit 13 to achieve an arbitrary shift ranging from a 7-bit left shift to a 0-bit shift.

An intermediate data holding circuit 30 holds and outputs the intermediate data which is an output of the first shift circuit 10 to a second shift circuit next thereto.

A control signal holding circuit 40 holds and outputs a second control signal.

The second shift circuit 50 performs a shift process with respect to the intermediate data based on the second control signal output by the control signal holding circuit 40, and outputs the result as output data. Here, the second shift circuit 50 is composed of an 8-bit left-shift circuit 51 and a 16-bit right-shift circuit 52. By combining the shift processes of the first and second shift circuits, an arbitrary shift ranging from a 15-bit left shift to a 16-bit right shift is achieved with respect to input data.

Patent Document 1: Japanese Patent Unexamined Publication No. 2000-293354 (page 7, FIG. 1)

DISCLOSURE OF THE INVENTION

PROBLEMS TO BE SOLVED BY THE INVENTION

However, in the technology of dividing a conventional barrel shift device into pipeline registers, the bit width of data is increased every time the data is passed through each shift circuit constituting the first shift circuit, resulting in a large bit width of the intermediate data output by the first shift circuit. Therefore, the packaging scale of the intermediate data holding circuit increases, resulting in an increase in power consumption.

The present invention is provided to solve the above-described conventional problems. An object of the present invention is to suppress an increase in power due to a pipeline structure by controlling the data storing operation of the intermediate data holding circuit.

DISCLOSURE OF THE INVENTION

To achieve the above-described object, in a barrel shift device of the present invention, an operation of storing the whole or a part of unnecessary data elements other than data elements to be output as final output data, among intermediate data held in the intermediate data holding circuit, is suppressed.

A barrel shift device of the present invention for receiving input data having a predetermined bit width, shifting the input data to the right or left by a total shift amount obtained by combining a first shift amount and a second shift amount, and outputting the resultant data as output data after a desired shift, comprises a first shift section of receiving the input data, shifting the input data based on a first control signal for controlling the first shift amount, and outputting the resultant data as intermediate data, an intermediate data holding section for holding the intermediate data from the first shift section, a control signal holding section of holding and outputting a second control signal for controlling the second shift amount, a second shift section of receiving the intermediate data held in the intermediate data holding section, shifting the received intermediate data based on the second control signal output from the control signal holding section, and outputting the resultant data as the output data after the desired shift, and a decoding section of receiving the second control signal, and based on the second control signal, detecting digit positions in the intermediate data of data elements excluding the whole or a part of data elements other than data elements to be output as the output data after the desired shift from the second shift section, among all data elements constituting the intermediate data from the first shift section. The intermediate data holding section newly holds data elements at digit positions including at least the data elements to be output as the output data after the desired shift from the second shift section, excluding the whole or a part of data elements other than the data elements to be output as the output data after the desired shift from the second shift section, among the intermediate data, based on the digit positions detected by the decoding section.

In the barrel shift device of the present invention, based on all information indicated by the second control signal, the decoding section detects digit positions in the intermediate data of only the data elements to be output as the output data after the desired shift from the second shift section, among all the data elements constituting the intermediate data from the first shift section.

In the barrel shift device of the present invention, based on a part of information indicated by the second control signal, the decoding section detects digit positions in the intermediate data of data elements excluding a part of data elements other than the data elements to be output as the output data after the desired shift from the second shift section, among all the data elements constituting the intermediate data from the first shift section.

In the barrel shift device of the present invention, the second control signal is a control signal including a multi-bit signal, and based on a predetermined 1-bit signal of the second control signal, the intermediate data holding section holds and outputs data elements at digit positions excluding a part of data elements other than the data elements to be output as the output data after the desired shift from the second shift section, among all the data elements constituting the intermediate data from the first shift section.

A barrel shift device of the present invention for receiving input data having a predetermined bit width, shifting the input data to the right or left by a total shift amount obtained by combining a first shift amount and a second shift amount, and outputting the resultant data as output data after a desired shift, comprises a first shift section of receiving the input data, shifting the input data based on a first control signal for controlling the first shift amount, and outputting the resultant data as intermediate data, an intermediate data holding section for holding the intermediate data from the first shift section, a control signal holding section of holding and outputting a second control signal for controlling the second shift amount, a second shift section of receiving the intermediate data held in the intermediate data holding section, shifting the received intermediate data based on the second control signal output from the control signal holding section, and outputting the resultant data as the output data after the desired shift, and a decoding section of receiving the first control signal, and based on the first control signal, detecting digit positions of data elements in the input data, among all data elements constituting the intermediate data from the first shift section. The intermediate data holding section newly holds data elements at digit positions including at least the data elements included in the input data, among all the data elements constituting the intermediate data, based on the digit positions detected by the decoding section.

In the barrel shift device of the present invention, based on all information indicated by the first control signal, the decoding section detects digit positions in the intermediate data of only the data elements included in the input data, among all the data elements constituting the intermediate data from the first shift section.

In the barrel shift device of the present invention, based on a part of information indicated by the first control signal, the decoding section detects digit positions in the intermediate data of data elements excluding a part of data elements other than the data elements included in the input data, among all the data elements constituting the intermediate data from the first shift section.

In the barrel shift device of the present invention, the first control signal is a control signal including a multi-bit signal, and based on a predetermined 1-bit signal of the first control signal, the intermediate data holding section holds and outputs data elements at digit positions excluding a part of data elements other than the data elements included in the input data after shift process by first shift section, among all the data elements constituting the intermediate data from the first shift section.

According to the present invention, the second control signal for controlling a shift amount to be applied in the second shift section is decoded using the decoding section, thereby detecting digit positions of data elements to be output as output data from intermediate data, and the intermediate data holding section operates to hold at least intermediate data elements at the digit positions. Therefore, unnecessary data elements which are not to be output as final data are not stored in the intermediate data holding section, and previously held data elements continue to be held, thereby making it possible to reduce power consumption by a corresponding amount.

According to the present invention, the first control signal for controlling a shift amount to be applied in the first shift section is decoded using the decoding section, thereby detecting at least digit positions of data elements included in input data among all data elements constituting intermediate data, and the intermediate data holding section operates to hold at least intermediate data elements of the digit positions. Therefore, data elements other than the data elements of the input data are not stored in the intermediate data holding section, and previously held data elements continue to be held, thereby making it possible to reduce power consumption by a corresponding amount.

EFFECT OF THE INVENTION

As described above, according to the barrel shift device of the present invention, information about a shift amount to be applied in the second shift section between the intermediate data holding section inserted in accordance with a pipeline structure and outputting of data, is used as a control signal to suppress an operation of holding data elements which are not finally output in the intermediate data holding section. As a result, it is possible to reduce power consumption.

According to the barrel shift device of the present invention, information about a shift amount to be applied in the first shift section between inputting of data and the intermediate data holding section inserted in accordance with a pipeline structure, is used as a control signal to suppress an operation of storing and holding unnecessary data elements in the intermediate data holding section. As a result, it is possible to reduce power consumption.

BRIEF DESCRIPTION OF THE DRAWINGS

FIG. 3 is a diagram for explaining an operation of an intermediate data holding circuit of the first embodiment of the present invention.

FIG. 4 is a diagram for explaining an operation of the intermediate data holding circuit of the first embodiment of the present invention.

Figure 1:
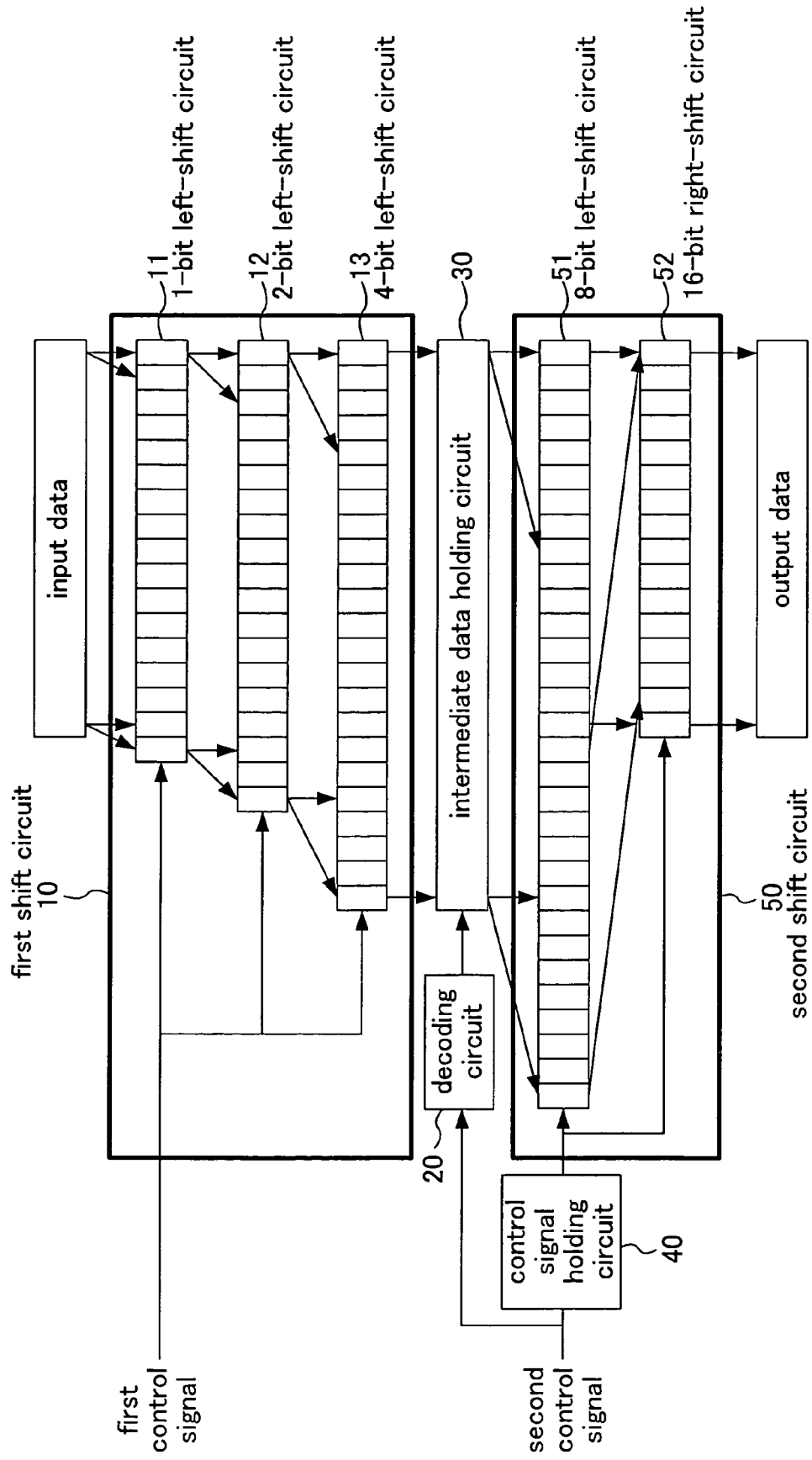
FIG. 1 is a schematic diagram illustrating a barrel shift device of a first embodiment of the present invention.

DESCRIPTION OF THE CHARACTERS 10 first shift circuit (first shift section)
11 1-bit left-shift circuit
12 2-bit left-shift circuit
13 4-bit left-shift circuit
20, 60 decoding circuit (decoding section)
30 intermediate data holding circuit (intermediate data holding section)
40 control signal holding circuit (control signal holding section)
50 second shift circuit (second shift section)
51 8-bit left-shift circuit
52 16-bit right-shift circuit
C1[2:0] first control signal
C1[0] 1-bit data of first control signal (predetermined 1-bit signal)
C2[1:0] second control signal
C2[0] 1-bit data of second control signal (predetermined 1-bit signal)
Hi active state of signal
Lo passive state of signal
O output of value 0
S output of sign extension
H output of held data

BEST MODE FOR CARRYING OUT THE INVENTION

Hereinafter, embodiments of the present invention will be described with reference to the accompanying drawings.

FIRST EMBODIMENT

FIG. 1 is a schematic diagram illustrating a barrel shift device of a first embodiment.

As illustrated in FIG. 1, the barrel shift device of this embodiment is divided into pipeline registers, and a shift process is performed in a multistage process stage.

Here, a configuration of the barrel shift device of this embodiment will be described with reference to FIG. 1. Note that, in this embodiment, for the sake of simplicity, the barrel shift device is assumed to be capable of an arbitrary arithmetic shift ranging from 15 bits to the left to 16 bits to the right with respect to 16-bit data (input data having a predetermined bit width).

In FIG. 1, 10 indicates a first shift circuit which performs a shift process with respect to input data based on a first control signal composed of 3-bit data, and outputs intermediate data to the intermediate data holding circuit 30. The first shift circuit 10 is composed of three shift circuits, i.e., a 1-bit left-shift circuit 11, a 2-bit left-shift circuit 12, and a 4-bit left-shift circuit 13. The three shift circuits 11, 12, and 13 receive respective corresponding bit data in the first control signal. Specifically, shift processes of the three shift circuits 11, 12, and 13 are combined in accordance with a combination of the pieces of bit data of the first control signal to achieve an arbitrary shift amount (first shift amount) from a 7-bit left shift to a 0-bit shift.

50 indicates a second shift circuit which receives the intermediate data output by the intermediate data holding circuit 30, performs a predetermined shift process, following the shift process of the first shift circuit 10, to complete a desired shift as a whole, and outputs output data. As illustrated in FIG. 1, the second shift circuit 50 is composed of an 8-bit left-shift circuit 51 and a 16-bit right-shift circuit 52. Although the second shift circuit 50 performs a shift (shift with a second shift amount) process by control of a second control signal externally input as in the first shift circuit 10, the second control signal is not input directly to the second shift circuit 50. The second control signal is input to a decoding circuit 20, and is also input to the second shift circuit 50 via a control signal holding circuit 40 which temporarily holds the second control signal. The second control signal which has been input via the control signal holding circuit 40 to the second shift circuit 50 is divided into two, which are respectively input to the two shift circuits 51 and 52 of the second shift circuit 50. Following the shift process by the first shift circuit 10, a shift process is performed by a combination of the shift processes of the two shift circuits 51 and 52 to complete an arbitrary shift ranging from a 15-bit left shift to a 16-bit right shift of the input data, i.e., a desired shift.

On the other hand, the decoding circuit 20 which has received the second control signal detects, based on the second control signal, digit positions in the intermediate data holding circuit 30 of data elements of output data to be output as a result of a shift process by the second shift circuit 50, among data elements of the intermediate data, and outputs a result of the detection to the intermediate data holding circuit 30. Using the detection result of the decoding circuit 20, the intermediate data holding circuit 30 holds, as output data, only data elements at digit positions to be output from the second shift circuit 50, or data elements which include the data elements at the output digit positions and exclude a portion of unnecessary data which is not included in the output data. By such a function of the decoding circuit 20, the intermediate data holding circuit 30 can eliminate an unnecessary storage operation corresponding to unnecessary data elements which are not output as data elements of output data and do not need to be held, thereby making it possible to reduce power consumption.

Figure 2:
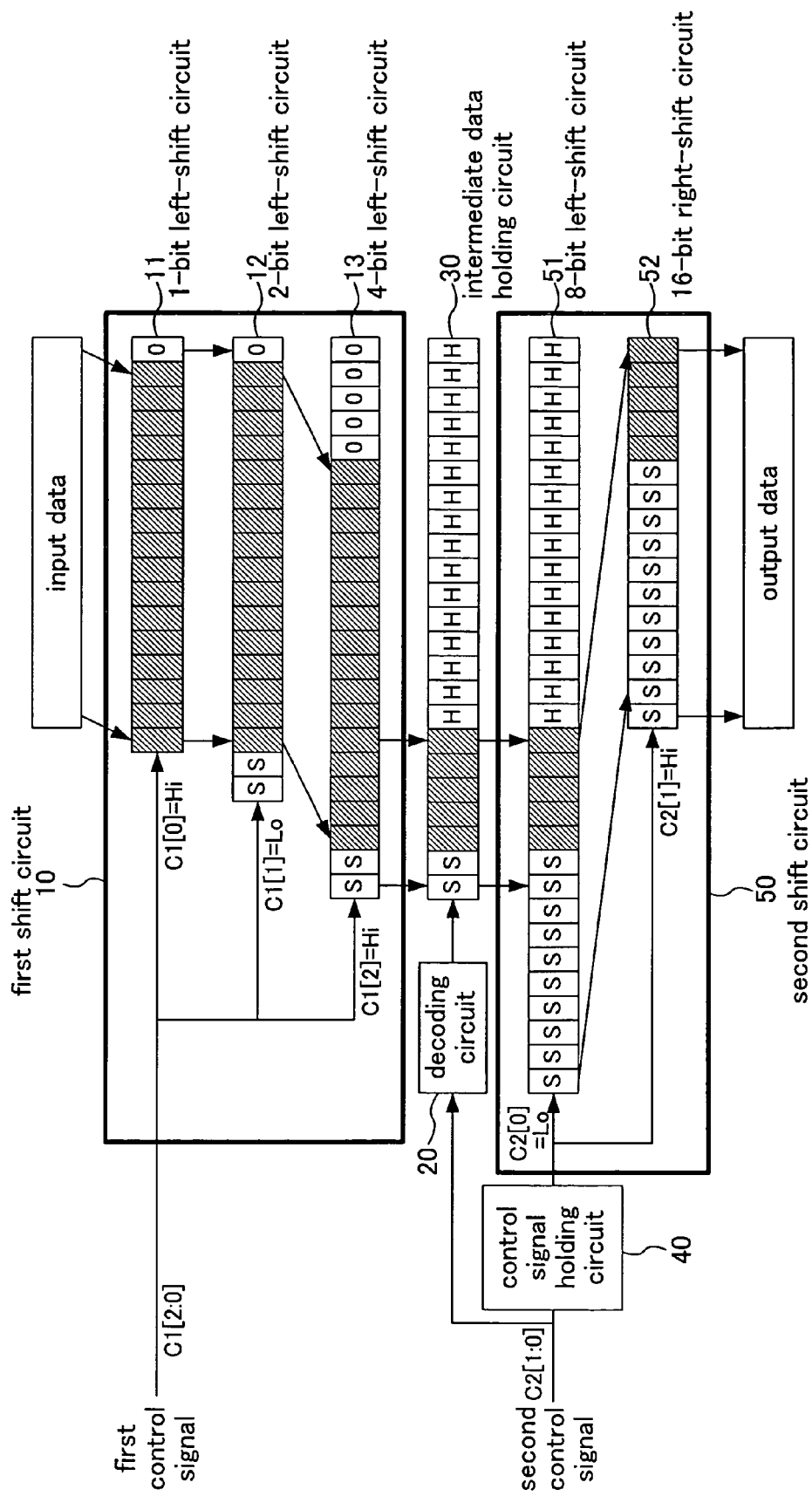
FIG. 2 is a diagram for explaining an operation of an 11-bit right-shift process of the first embodiment of the present invention.

Next, a specific shift process operation of the barrel shift device of this embodiment will be described with reference to FIG. 2. Here, as a specific exemplary shift process, the case where an 11-bit right-shift process is performed will be described. In FIG. 2, "0" indicates a value 0, "S" indicates sign extension, and "H" indicates held data.

A first control signal C1[2:0] of FIG. 2 is 3-bit data which is composed of three pieces of 1-bit data C1[0], C1[1], and C1[2]. The 1-bit left-shift circuit 11, the 2-bit left-shift circuit 12, and the 4-bit left-shift circuit 13 constituting the first shift circuit 10 are controlled using the bit data C1[0], C1[1], and C1[2] of the first control signal, respectively. In the 11-bit right-shift process, the 1-bit data C1[0] and C1[2] of the first control signal are in an active state "Hi" and the 1-bit data C1[1] of the first control signal is in a passive state "Lo". The input data input to the first shift circuit 10 is shifted based on the first control signal C1[2:0].

Initially, a 1-bit left shift process is performed in the 1-bit left-shift circuit 11, zeroth bit data is buried with a value 0, and the resultant data is output as 17-bit width data. Next, in the 2-bit left-shift process circuit 12, the data is not shifted, the data is sign-extended with 17th bit data and 18th bit data, and the resultant data is output as 19-bit width data. Further, in the 4-bit left-shift circuit 13, the data is shifted 4 bits to the left, the zeroth bit data, the first bit data, the second bit data, and the third bit data are buried with a value 0, and the resultant data is output as 23-bit width data (intermediate data) to the intermediate data holding circuit 30.

A second control signal C2[1:0] is 2-bit data which is composed of 1-bit data C2[0] and C2[1]. The 8-bit left-shift circuit 51 and the 16-bit right-shift circuit 52 constituting the second shift circuit 50 are controlled with the bit data C2[0] and C2[1] of the second control signal, respectively. The decoding circuit 20 detects digit positions of the intermediate data to what each data element of output data to be output after a shift process in the second shift circuit 50 is output, based on the second control signal C2[1:0], and outputs a result of the detection to the intermediate data holding circuit 30. The digit position detecting operation will be specifically described. For example, in the 11-bit right-shift process, the bit data C2[1] of the second control signal is in the active state "Hi", and the bit data C2[0] of the second control signal is in the passive state "Lo", so that, in the second shift circuit 50, a 16-bit right-shift process is performed, and therefore, it is known that data elements at the digit positions of the 16th to 22nd bits of the intermediate data are to be output as data elements of output data. Therefore, based on the result of the digit position detection by the decoding circuit 20, the intermediate data holding circuit 30 newly stores and holds the data elements at the digit positions of the 16th to 22nd bits of the intermediate data and continues to hold previously held data elements as data elements at the digit positions of the zeroth to 15th bits other than the detected digit positions.

The control signal holding circuit 40 holds and outputs the second control signal C2[1:0] to the second shift circuit 50. The 8-bit left-shift circuit 51 and the 16-bit right-shift circuit 52 constituting the second shift circuit 50 are controlled using the bit data C2[0] and C2[1] of the second control signal which have been held and output by the control signal holding circuit 40, respectively. Hereinafter, for the sake of simplicity, a signal after being held by the control signal holding circuit 40 is also represented by a second control signal C2[1:0]. In the 11-bit right-shift process, the bit data C2[1] of the second control signal is in the active state "Hi", and the bit data C2[0] of the second control signal is in the passive state "Lo". The output of the intermediate data holding circuit 30 input to the second shift circuit 50 is subjected to a shift process based on the second control signal C2[1:0].

Initially, in the 8-bit left-shift process circuit 51, the data is not shifted, the data is sign-extended with the digit positions of 23rd to 30th bits, and the resultant data is output as 31-bit width data. Next, in the 16-bit right-shift circuit 52, the data is shifted 16 bits to the right, the data is sign-extended with the digit positions of a 15th bit, and the resultant data is output as 16-bit width data.

FIG. 3 is a diagram for explaining an operation of the intermediate data holding circuit 30. The intermediate data holding circuit 30 is operated as described below, depending on the state of the second control signal C2[1:0], based on the output of the decoding circuit 20.

When both the bit data C2[0] and C2[1] of the second control signal are in the passive state "Lo", the data elements at the digit positions of the zeroth to 15th bits of the intermediate data are output without a change as 16-bit output data. Therefore, the data elements at the digit positions of the zeroth to 15th bits of the intermediate data are stored and held in the intermediate data holding circuit 30.

When the bit data C2[0] of the second control signal is in the active state "Hi", and the bit data C2[1] of the second control signal is in the passive state "Lo", an 8-bit left shift is performed in the 8-bit left-shift process circuit 51, and a shift process is not performed (i.e., no change is made) in the 16-bit right-shift process circuit 52, i.e., an 8-bit left shift is performed in the second shift circuit 50. Thus, the 8-bit left shift is performed in the intermediate data, so that the data elements at the digit positions of the zeroth to seventh bits remaining in the 16-bit width of the output data are stored and held in the intermediate data holding circuit 30.

When the bit data C2[1] of the second control signal is in the active state "Hi" and the bit data C2[0] of the second control signal is in the passive state "Lo", a shift process is not performed (i.e., no change is made) in the 8-bit left-shift process circuit 51, and a 16-bit right-shift process is performed in the 16-bit right-shift process circuit 52, i.e., a 16-bit right-shift process is performed in the second shift circuit 50. Thus, the 16-bit right-shift is performed in the intermediate data, so that the data elements at the digit positions of the 16th to 22nd bits remaining in the 16-bit width of the output data are stored and held in the intermediate data holding circuit 30.

When both the bit data C2[0] and C2[1] of the second control signal are in the active state "Hi", an 8-bit left shift is performed in the 8-bit left-shift process circuit 51, and a 16-bit right-shift process is performed in the 16-bit right-shift process circuit 52, i.e., an 8-bit right-shift process is performed in the second shift process circuit 50. Thus, the 8-bit right-shift is performed in the intermediate data, so that the data elements at the digit positions of the eighth to 22nd bits remaining in the 16-bit width of the output data are stored and held in the intermediate data holding circuit 30.

Thus, among all the data elements constituting the intermediate data, only data elements which are to be output data are stored and held in the intermediate data holding circuit 30.

FIG. 4 is a diagram for explaining an operation of the intermediate data holding circuit 30. The decoding circuit 20 may decode a portion of the second control signal C2[1:0]. Here, the bit data (predetermined 1-bit data) C2[1] of the second control signal is output without a change to the intermediate data holding circuit 30. The intermediate data holding circuit 30 is operated as described below, depending on the state of the bit data C2[1] of the second control signal, based on the output of the decoding circuit 20.

When the bit data C2[1] of the second control signal is in the passive state "Lo", since the data elements at the digit positions of the zeroth to 15th bits in the intermediate data include output data to be output from the second shift circuit 50 irrespective of any state of the bit data C2[0] of the second control signal as described in FIG. 3, the data elements at the digit positions of the zeroth to 15th bits are stored and held in the intermediate data holding circuit 30.

When the bit data C2[1] of the second control signal is in the active state "Hi", since the data elements at the digit positions of the eighth to 22nd bits in the intermediate data include output data to be output from the second shift circuit 50 irrespective of any state of the bit data C2[0] of the second control signal as described in FIG. 3, the data elements at the digit positions of the eighth to 22nd bits are stored and held in the intermediate data holding circuit 30.

Thus, digit positions including at least data elements which are to be output data may be detected by the decoding circuit 20, the data elements at the digit positions including the output data may be stored and held in the intermediate data holding circuit 30, and sign-extended data or data in which a value 0 is buried may be partially stored in the intermediate data holding circuit 30.

The case of FIG. 3 is most effective in terms of low power consumption. However, the decoding circuit 20 can be simplified by decoding a portion of the second control signal C2[1:0].

Although the arithmetic shift process is assumed as described above, the sign extension may be replaced with value-0 extension in the case of a logical shift process. The same is true of other shift processes.

As described above, in the first embodiment, by controlling the operation of the intermediate data holding circuit 30, an operation of storing unnecessary data elements to a memory circuit constituting the intermediate data holding circuit 30 is prevented so that previous data elements continue to be held. Thereby, as compared to the conventional technology, a reduction in power consumption of the intermediate data holding circuit 30 and a reduction in power consumption due to suppression of activation of the second shift circuit can be achieved.

SECOND EMBODIMENT

Figure 5:
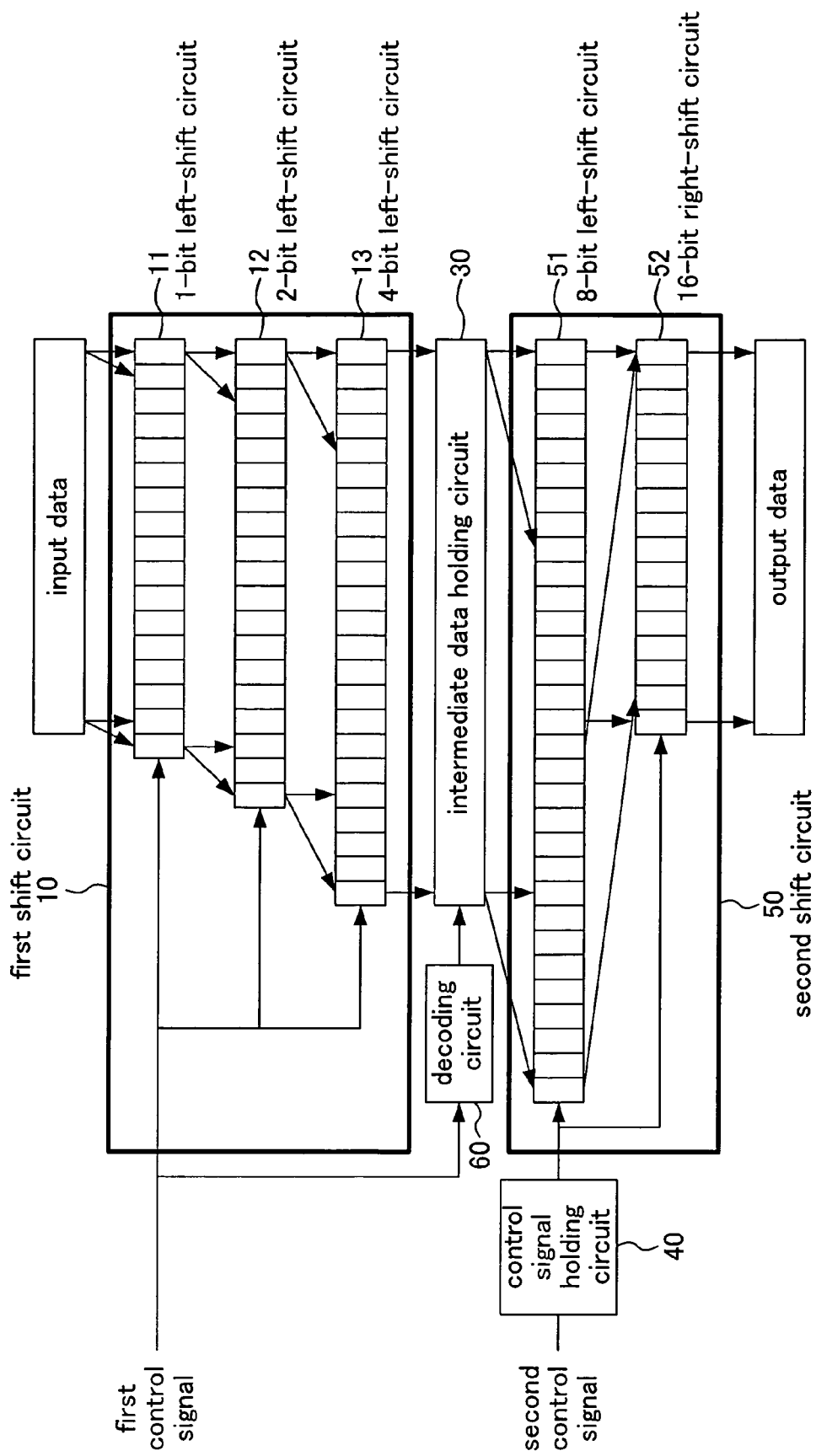
FIG. 5 is a schematic diagram illustrating a barrel shift device of a second embodiment of the present invention.

FIG. 5 is a schematic diagram illustrating a barrel shift device of a second embodiment.

The barrel shift device of this embodiment of FIG. 5 is divided into pipeline registers and a shift process is performed in a multistage process stage as in the first embodiment.

Firstly, a configuration of the barrel shift device of this embodiment will be described with reference to FIG. 5. Note that, in this embodiment, for the sake of simplicity, the barrel shift device is assumed to be capable of an arbitrary arithmetic shift ranging from 15 bits to the left to 16 bits to the right with respect to 16-bit data (input data having a predetermined bit width). In the first embodiment, the same components as those of the barrel shift device described with reference to FIG. 1 are indicated with the same reference numerals and will not be described.

The barrel shift device of FIG. 5 is different from the barrel shift device of the first embodiment of FIG. 1 in that a control signal which is received by a decoding circuit 60 is the first control signal, but not the second control signal, and digit positions in the intermediate data holding circuit 30 of input data elements shifted by the first shift circuit 10 are detected based on the input first control signal. In the detection based on the first control signal, the decoding circuit 60 detects digit positions to which at least data elements of input data after a shift by the first shift circuit are output, among data to be output from the first shift circuit 10. Thereafter, the intermediate data holding circuit 30, which has received a result of the detection, holds only data elements excluding the whole or a part of data elements other than the data elements of the input data, among all data elements constituting the intermediate data, and outputs the data elements thus held to the second shift circuit 50.

Thereby, data which should be held in the intermediate data holding circuit 30 can be reduced, and an unnecessary storage operation can be suppressed, thereby making it possible to reduce power consumption.

Figure 6:
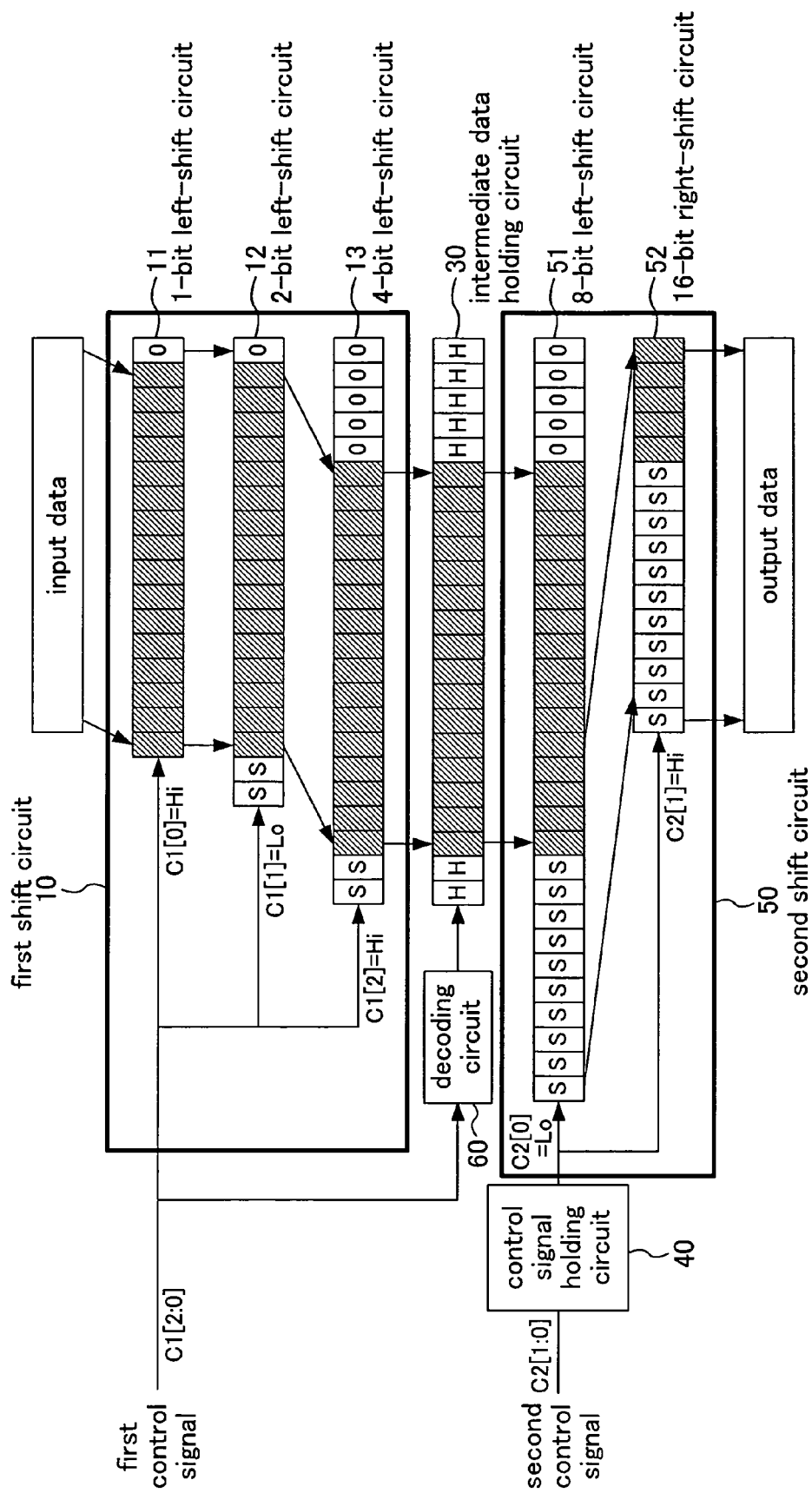
FIG. 6 is a diagram for explaining an operation of an 11-bit right-shift of the second embodiment of the present invention.

Next, a specific shift process operation of the barrel shift device of this embodiment will be described with reference to FIG. 6. Here, as a specific example of the shift process, the case where an 11-bit right-shift process is performed will be described. In FIG. 6, "0" indicates a value 0, "S" indicates sign extension, and "H" indicates held data.

A first control signal C1[2:0] is 3-bit data which is composed of 1-bit data C1[0], C1[1], and C1[2]. The 1-bit left-shift circuit 11, the 2-bit left-shift circuit 12, and the 4-bit left-shift circuit 13 constituting the first shift circuit 10 are controlled using the bit data C1[0], C[1], and C1[2] of the first control signal, respectively. In an 11-bit right-shift process, the 1-bit data C1[0] and C1[2] of the first control signal are in the active state "Hi" and the 1-bit data C1[1] of the first control signal is in the passive state "Lo". The input data input to the first shift circuit 10 is subjected to a shift process based on the first control signal C1[2:0].

Initially, a 1-bit left shift process is performed in the 1-bit left-shift circuit 11, zeroth bit data is buried with a value 0, and the resultant data is output as 17-bit width data. Next, in the 2-bit left-shift process circuit 12, the data is not shifted, the data is sign-extended with 17th bit data and 18th bit data, and the resultant data is output as 19-bit width data. Further, in the 4-bit left-shift circuit 13, the data is shifted 4 bits to the left, the digit positions of the zeroth bit data, the first bit data, the second bit data, and the third bit data are buried with a value 0, and the resultant data is output as 23-bit width data (intermediate data) to the intermediate data holding circuit 30.

The decoding circuit 60 detects to what digit positions of the intermediate data each data element of the input data is output, based on the first control signal C1[1:0], and outputs a result of the detection to the intermediate data holding circuit 30. In the 11-bit right-shift process, the bit data C1[0] and C1[2] of the first control signal is in the active state "Hi", and the bit data C1[1] of the first control signal is in the passive state "Lo", so that, in the first shift circuit 10, a 5-bit left-shift process is performed, and therefore, the data elements at the digit positions of the fifth to 20th bits of the intermediate data are data elements of the input data.

Based on the output of the decoding circuit 60, the intermediate data holding circuit 30 stores and holds the data elements at the digit positions of the fifth to 20th bits of the intermediate data, and continues to hold previous data elements regarding data elements at the digit positions of the zeroth to fourth bits and 21st and 22nd bits. Thereafter, at the stage of outputting to the second shift circuit 50, data elements having a value 0 are output with respect to the digit positions of the zeroth to fourth bits, and the stored and held data elements are output with respect to the digit positions of the fifth to 20th bits, and sign extension is performed with respect to the 21st and 22nd bits. Thus, in this embodiment, the case of arithmetic shift calculation is described, and therefore, the sign of the input data is output to digit positions upper than the held data, and data elements having a value 0 are output to digit positions lower than the held data.

The control signal holding circuit 40 holds and outputs the second control signal C2[1:0] to the second shift circuit 50. The 8-bit left-shift circuit 51 and the 16-bit right-shift circuit 52 constituting the second shift circuit 50 are controlled using the bit data C2[0] and C2[1] of the second control signal which have been held and output by the control signal holding circuit 40, respectively. Hereinafter, for the sake of simplicity, a signal after being held by the control signal holding circuit 40 is also represented by a second control signal C2[1:0]. In the 11-bit right-shift process, the bit data C2[1] of the second control signal is in the active state "Hi", and the bit data C2[0] of the second control signal is in the passive state "Lo". The output of the intermediate data holding circuit 30 input to the second shift circuit 50 is shifted based on the second control signal C2[1:0].

Initially, in the 8-bit left-shift process circuit 51, the data is not subjected to a shift process, the data is sign-extended with 23rd to 30th bits, and the resultant data is output as 31-bit width data. Next, in the 16-bit right-shift circuit 52, the data is shifted 16 bits to the right, the data is sign-extended with a 15th bit, and the resultant data is output as 16-bit width data.

Figure 7:
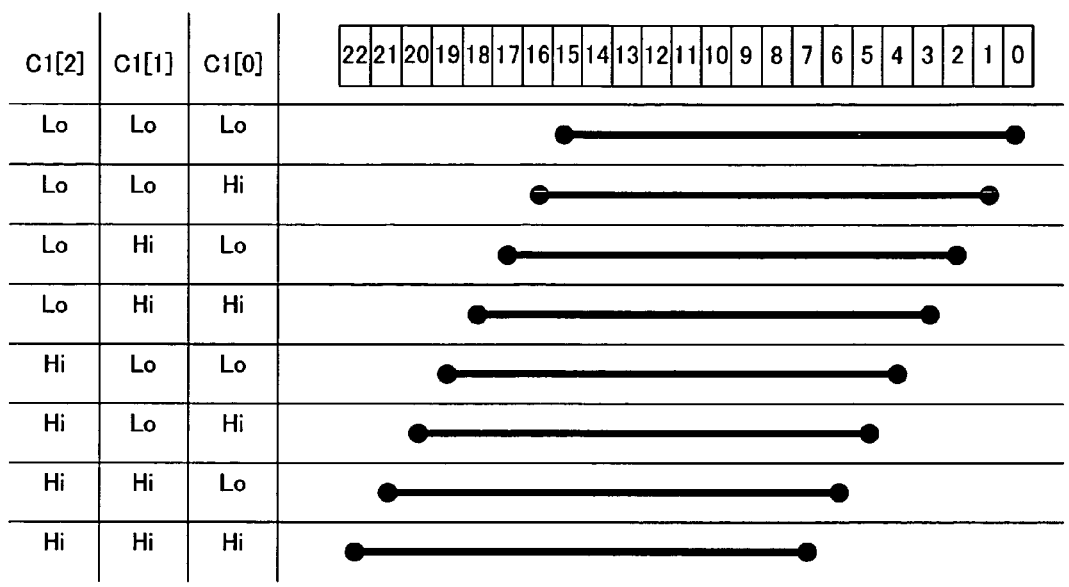
FIG. 7 is a diagram for explaining an operation of an intermediate data holding circuit of the second embodiment of the present invention.

FIG. 7 is a diagram for explaining an operation of the intermediate data holding circuit 30. The intermediate data holding circuit 30 is operated as described below, depending on the state of the first control signal C1[2:0], based on the output of the decoding circuit 20.

When all of the bit data C1[0], C1[1], and C1[2] of the first control signal are in the passive state "Lo", the data elements at the digit positions of the zeroth to 15th bits of the input data are output without a change as 16-bit intermediate data from the first shift circuit 10. Therefore, the data elements at the digit positions of the zeroth to 15th bits of the intermediate data are stored and held in the intermediate data holding circuit 30.

When the bit data C1[0] of the first control signal is in the active state "Hi" and the bit data C1[1] and C1[2] of the first control signal are in the passive state "Lo", a 1-bit left shift is performed by the 1-bit left-shift process circuit 11, and a shift process is not performed (i.e., no change is made) in the 2-bit left-shift process circuit 12 and the 4-bit left-shift process circuit 13. Thus, in the first shift circuit 10, a 1-bit left shift is performed, so that, as intermediate data, data elements at the digit positions of the first to 16th bits which are digit positions to which input data is output, are stored and held in the intermediate data holding circuit 30.

When the bit data C1[1] of the first control signal is in the active state "Hi" and the bit data C1[0] and C1[2] of the first control signal are in the passive state "Lo", a 2-bit left shift is performed by the 2-bit left-shift process circuit 12, and a shift process is not performed (i.e., no change is made) in the 1-bit left-shift process circuit 11 and the 4-bit left-shift process circuit 13. Thus, in the first shift circuit 10, a 2-bit left shift is performed, so that, as intermediate data, data elements at the digit positions of the second to 17th bits which are digit positions to which input data is output, are stored and held in the intermediate data holding circuit 30.

When the bit data C1[0] and C1[1] of the first control signal are in the active state "Hi" and the bit data C1[2] of the first control signal is in the passive state "Lo", a 1-bit left shift is performed by the 1-bit left-shift process circuit 11, a 2-bit left shift is performed by the 2-bit left-shift process circuit 12, and a shift process is not performed (i.e., no change is made) in the 4-bit left-shift process circuit 13. Thus, in the first shift circuit 10, a 3-bit left shift is performed, so that, as intermediate data, data elements at the digit positions of the third to 18th bits which are digit positions from which input data is output, are stored and held in the intermediate data holding circuit 30.

When the bit data C1[2] of the first control signal is in the active state "Hi" and the bit data C1[0] and C1[1] of the first control signal are in the passive state "Lo", a 4-bit left shift is performed by the 4-bit left-shift process circuit 13, and a shift process is not performed (i.e., no change is made) in the 1-bit left-shift process circuit 11 and the 2-bit left-shift process circuit 12. Thus, in the first shift circuit 10, a 4-bit left shift is performed, so that, as intermediate data, data elements at the digit positions of the fourth to 19th bits which are digit positions from which input data is output, are stored and held in the intermediate data holding circuit 30.

When the bit data C1[0] and C1[2] of the first control signal are in the active state "Hi" and the bit data C1[1] of the first control signal is in the passive state "Lo", a 1-bit left shift is performed by the 1-bit left-shift process circuit 11, a 4-bit left shift is performed by the 4-bit left-shift process circuit 13, and a shift process is not performed (i.e., no change is made) in the 2-bit left-shift process circuit 12. Thus, in the first shift circuit 10, a 5-bit left shift is performed, so that, as intermediate data, data elements at the digit positions of the fifth to 20th bits which are digit positions from which input data is output, are stored and held in the intermediate data holding circuit 30.

When the bit data C1[1] and C1[2] of the first control signal are in the active state "Hi" and the bit data C1[0] of the first control signal is in the passive state "Lo", a 2-bit left shift is performed by the 2-bit left-shift process circuit 11, a 4-bit left shift is performed by the 4-bit left-shift process circuit 13, and a shift process is not performed (i.e., no change is made) in the 1-bit left-shift process circuit 12. Thus, in the first shift circuit 10, a 6-bit left shift is performed, so that, as intermediate data, data elements at the digit positions of the sixth to 21st bits which are digit positions from which input data is output, are stored and held in the intermediate data holding circuit 30.

When all the bit data C1[0], C1[1], and C1[2] of the first control signal are in the active state "Hi", a 7-bit left shift is performed by the 1-bit left-shift process circuit 11, the 2-bit left-shift process circuit 12, and the 4-bit left-shift process circuit 13 (i.e., the first shift circuit 10), so that, as intermediate data, data elements at the digit positions of the seventh to 22nd bits which are digit positions from which input data is output, are stored and held in the intermediate data holding circuit 30.

Thus, among all of the data elements constituting the intermediate data, only the data elements of the input data are newly stored and held in the intermediate data holding circuit 30.

Figure 8:
FIG. 8 is a diagram for explaining an operation of the intermediate data holding circuit of the second embodiment of the present invention.

FIG. 8 is a diagram for explaining an operation of the intermediate data holding circuit. The decoding circuit 60 may decode a portion of the first control signal C1[2:0]. Here, the first control signal C1[2:1] is decoded and the resultant signal is output to the intermediate data holding circuit 30. The intermediate data holding circuit 30 is operated as described below, depending on the state of the first control signal C1[1:0], based on the output of the decoding circuit 60.

When both the bit data C1[1] and C1[2] of the first control signal are in the passive state "Lo", since the data elements at the digit positions of the zeroth to 16th bits in the intermediate data include the data elements of the intermediate data irrespective of any state of the bit data C1[0] of the first control signal as described in FIG. 7, the data elements at the digit positions of the zeroth to 16th bits are stored and held in the intermediate data holding circuit 30.

When the bit data C1[1] of the first control signal is in the active state "Hi" and the bit data C1[2] of the first control signal is in the passive state "Lo", since the data elements at the digit positions of the second to 18th bits in the intermediate data include the data elements of the intermediate data irrespective of any state of the bit data C1[0] of the first control signal as described in FIG. 7, the data elements at the digit positions of the second to 18th bits are stored and held in the intermediate data holding circuit 30.

When the bit data C1[2] of the first control signal is in the active state "Hi" and the bit data C1[1] of the first control signal is in the passive state "Lo", since the data elements at the digit positions of the fourth to 20th bits in the intermediate data include the data elements of the intermediate data irrespective of any state of the bit data C1[0] of the first control signal as described in FIG. 7, the data elements at the digit positions of the fourth to 20th bits are stored and held in the intermediate data holding circuit 30.

When both the bit data C1[1] and C1[2] of the first control signal are in the active state "Hi", since the data elements at the digit positions of the sixth to 22nd bits in the intermediate data include the data elements of the intermediate data irrespective of any state of the bit data C1[0] of the first control signal as described in FIG. 7, the data elements at the digit positions of the sixth to 22nd bits are stored and held in the intermediate data holding circuit 30.

Thus, at least data elements included in the input data are stored and held in the intermediate data holding circuit 30, and sign-extended data or data in which a value 0 is buried may be partially stored.

Figure 9:
FIG. 9 is a diagram for explaining an operation of the intermediate data holding circuit of the second embodiment of the present invention.
Figure 10:
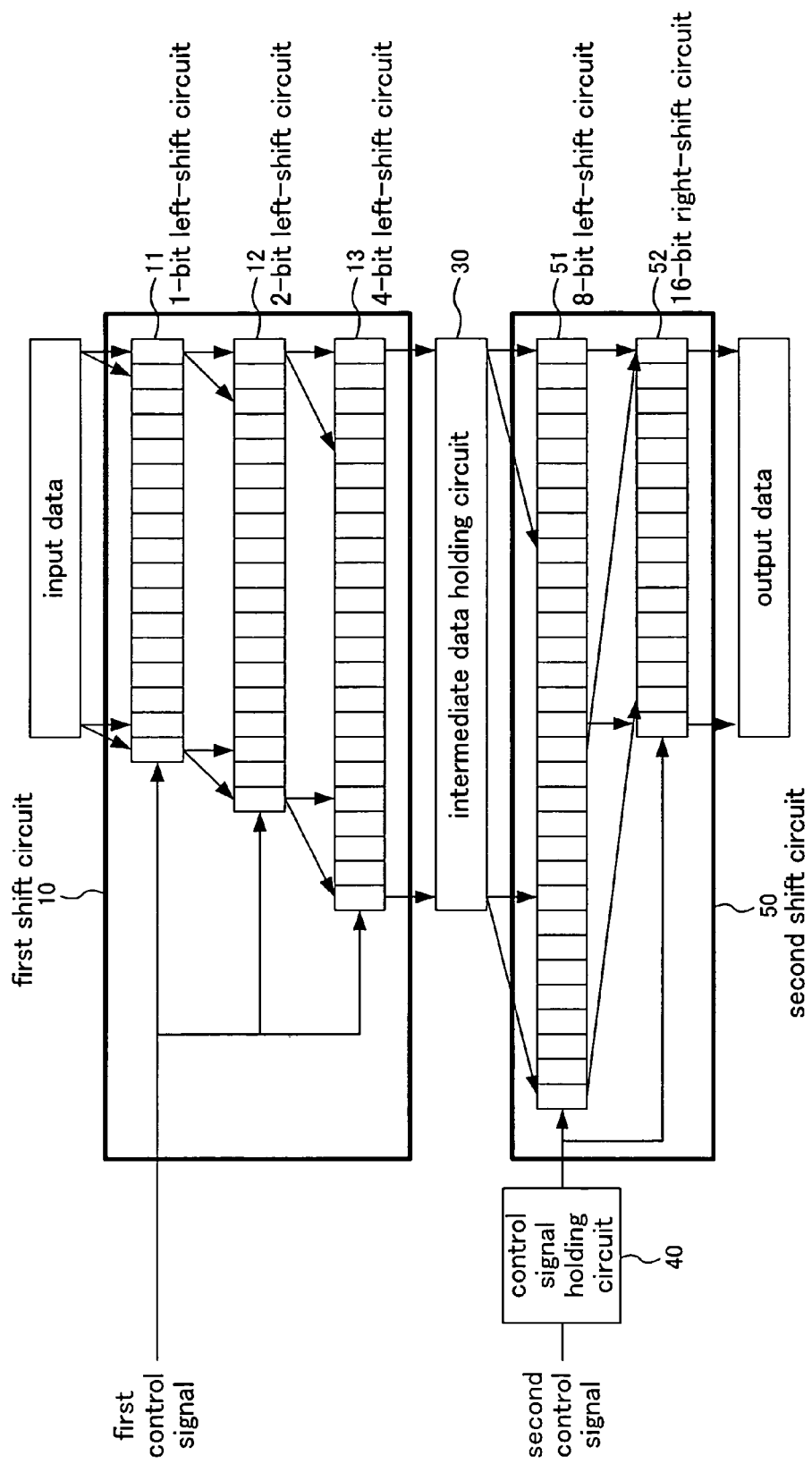
FIG. 10 is a schematic diagram illustrating a configuration of conventional technology.

FIG. 9 is a diagram for explaining an operation of the intermediate data holding circuit. The decoding circuit 60 may decode a portion of the first control signal C1[2:0]. Here, the bit data C1[2] of the first control signal, which has a size of one bit smaller than the case of FIG. 8, is output without a change to the intermediate data holding circuit 30. The intermediate data holding circuit 30 is operated as described below, depending on the state of the bit data C1[2] of the first control signal, based on the output of the decoding circuit 60.

When the bit data C1[2] of the first control signal is in the passive state "Lo", since the data elements at the digit positions of the zeroth to 18th bits in the intermediate data include the data elements of the intermediate data irrespective of any state of the bit data C1[0] and C1[1] of the first control signal as described in FIG. 7, the data elements at the digit positions of the zeroth to 18th bits are stored and held in the intermediate data holding circuit 30.

When the bit data C1[2] of the first control signal is in the active state "Hi", since the data elements at the digit positions of the fourth to 22nd bits in the intermediate data include the data elements of the intermediate data irrespective of any state of the bit data C1[0] and C1[1] of the first control signal as described in FIG. 7, the data elements at the digit positions of the fourth to 22nd bits are stored and held in the intermediate data holding circuit 30.

Thus, at least data elements included in the input data are stored and held in the intermediate data holding circuit 30, and sign-extended data or data in which a value 0 is buried may be partially stored.

The case of FIG. 7 is most effective in terms of low power consumption. However, the decoding circuit 60 can be simplified by decoding a portion of the first control signal C1[2:0].

Although the arithmetic shift process is assumed as described above, the sign extension may be replaced with value-0 extension in the case of a logical shift process. The same is true of other shift processes.

As described above, in the second embodiment, by controlling the operation of the intermediate data holding circuit 30, an operation of storing unnecessary data to a memory circuit constituting the intermediate data holding circuit 30 is prevented, thereby making it possible to reduce power consumption of the intermediate data holding circuit 30 as compared to the conventional technology.

INDUSTRIAL APPLICABILITY

The barrel shift device of the present invention controls an operation of an intermediate data holding circuit inserted between shift circuits in accordance with a pipeline structure to suppress an operation of storing and holding unnecessary data elements which are not included in output data, thereby making it possible to reduce the power consumption of the barrel shift device. Therefore, the barrel shift device of the present invention is useful as, for example, a component of a semiconductor device which performs right and left shift processes with respect to multi-bit data in a digital signal process.

The invention claimed is:

1. A barrel shift device for receiving input data having a predetermined bit width, shifting the input data to the right or left by a total shift amount obtained by combining a first shift amount and a second shift amount, and outputting the resultant data as output data after a desired shift, comprising:
    a first shift section of receiving the input data, shifting the input data based on a first control signal for controlling the first shift amount, and outputting the resultant data as intermediate data;
    an intermediate data holding section for holding the intermediate data from the first shift section;
    a control signal holding section of holding and outputting a second control signal for controlling the second shift amount;
    a second shift section of receiving the intermediate data held in the intermediate data holding section, shifting the received intermediate data based on the second control signal output from the control signal holding section, and outputting the resultant data as the output data after the desired shift; and
    a decoding section of receiving the second control signal, and based on the second control signal, detecting digit positions in the intermediate data of data elements excluding the whole or a part of data elements other than data elements to be output as the output data after the desired shift from the second shift section, among all data elements constituting the intermediate data from the first shift section,
    wherein the intermediate data holding section newly holds data elements at digit positions including at least the data elements to be output as the output data after the desired shift from the second shift section, excluding the whole or a part of data elements other than the data elements to be output as the output data after the desired shift from the second shift section, among the intermediate data, based on the digit positions detected by the decoding section.

2. The barrel shift device of claim 1, wherein, based on all information indicated by the second control signal, the decoding section detects digit positions in the intermediate data of only the data elements to be output as the output data after the desired shift from the second shift section, among all the data elements constituting the intermediate data from the first shift section.

3. The barrel shift device of claim 1, wherein, based on a part of information indicated by the second control signal, the decoding section detects digit positions in the intermediate data of data elements excluding a part of data elements other than the data elements to be output as the output data after the desired shift from the second shift section, among all the data elements constituting the intermediate data from the first shift section.

4. The barrel shift device of claim 1, wherein
    the second control signal is a control signal including a multi-bit signal, and
    based on a predetermined 1-bit signal of the second control signal, the intermediate data holding section holds and outputs data elements at digit positions excluding a part of data elements other than the data elements to be output as the output data after the desired shift from the second shift section, among all the data elements constituting the intermediate data from the first shift section.

5. A barrel shift device for receiving input data having a predetermined bit width, shifting the input data to the right or left by a total shift amount obtained by combining a first shift amount and a second shift amount, and outputting the resultant data as output data after a desired shift, comprising:

a first shift section of receiving the input data, shifting the input data based on a first control signal for controlling the first shift amount, and outputting the resultant data as intermediate data;

an intermediate data holding section for holding the intermediate data from the first shift section;

a control signal holding section of holding and outputting a second control signal for controlling the second shift amount;

a second shift section of receiving the intermediate data held in the intermediate data holding section, shifting the received intermediate data based on the second control signal output from the control signal holding section, and outputting the resultant data as the output data after the desired shift; and a decoding section of receiving the first control signal, and based on the first control signal, detecting digit positions of data elements in the input data, among all data elements constituting the intermediate data from the first shift section, wherein the intermediate data holding section newly holds data elements at digit positions including at least the data elements included in the input data, among all the data elements constituting the intermediate data, based on the digit positions detected by the decoding section.

6. The barrel shift device of claim 5, wherein, based on all information indicated by the first control signal, the decoding section detects digit positions in the intermediate data of only the data elements included in the input data, among all the data elements constituting the intermediate data from the first shift section.

7. The barrel shift device of claim 5, wherein, based on a part of information indicated by the first control signal, the decoding section detects digit positions in the intermediate data of data elements excluding a part of data elements other than the data elements included in the input data, among all the data elements constituting the intermediate data from the first shift section.

8. The barrel shift device of claim 5, wherein
the first control signal is a control signal including a multi-bit signal, and
based on a predetermined 1-bit signal of the first control signal, the intermediate data holding section holds and outputs data elements at digit positions excluding a part of data elements other than the data elements included in the input data after shift process by first shift section, among all the data elements constituting the intermediate data from the first shift section.

* * * * *